No. 892,138. PATENTED JUNE 30, 1908.
W. A. CREW.
CEMENT BLOCK MOLD.
APPLICATION FILED JUNE 26, 1907.

3 SHEETS—SHEET 1.

Inventor
William A. Crew

Witnesses
G. R. Thomas

By
Attorneys

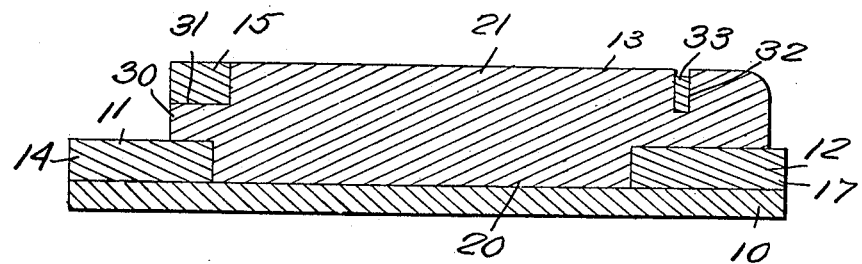
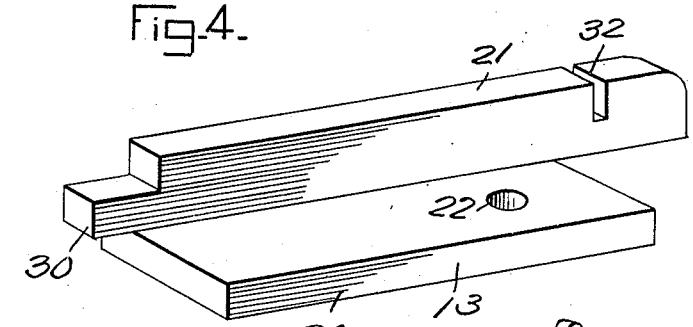
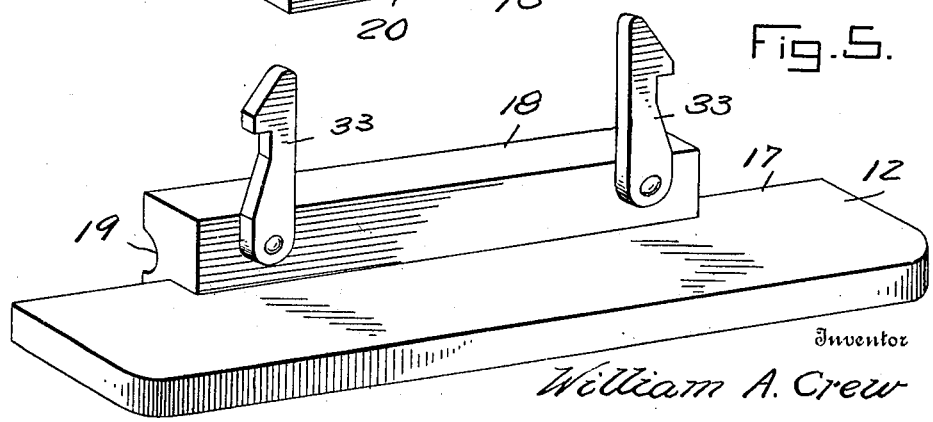

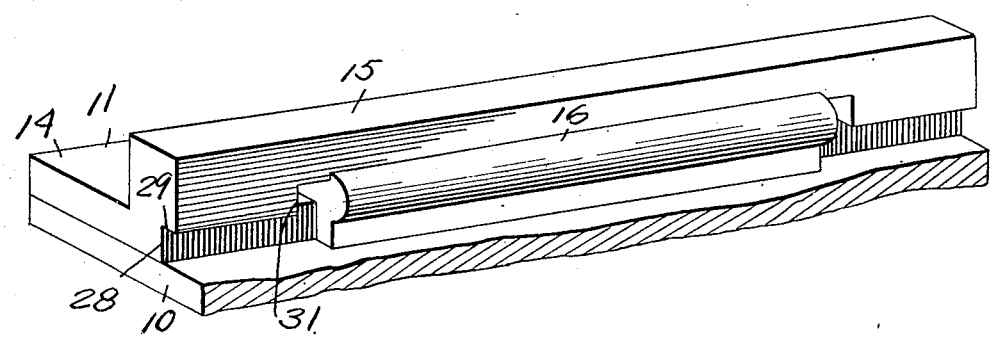
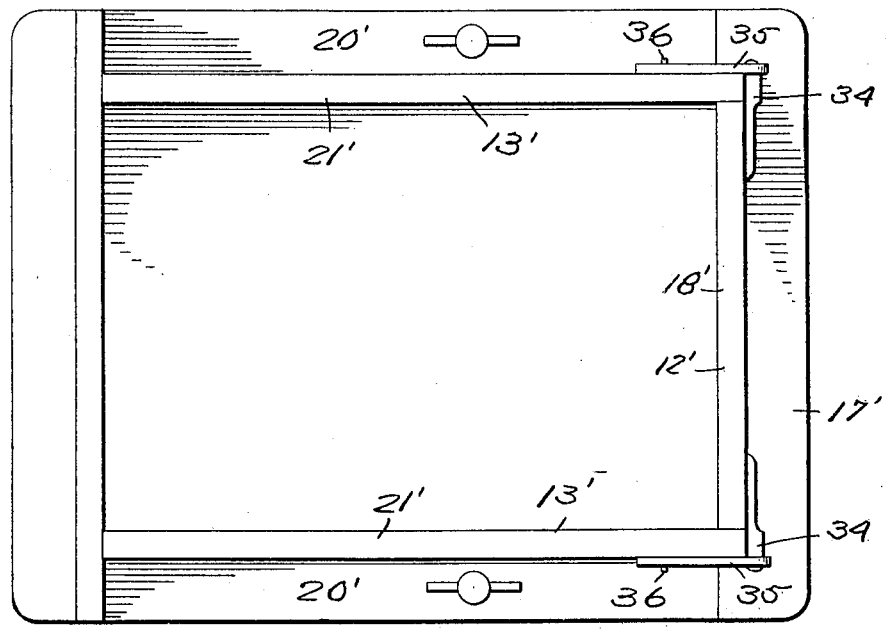

UNITED STATES PATENT OFFICE.

WILLIAM A. CREW, OF SALISBURY, MARYLAND.

CEMENT-BLOCK MOLD.

No. 892,138.  Specification of Letters Patent.  Patented June 30, 1908.

Application filed June 26, 1907. Serial No. 380,913.

*To all whom it may concern:*

Be it known that I, WILLIAM A. CREW, a citizen of the United States, residing at Salisbury, in the county of Wicomico, State of Maryland, have invented certain new and useful Improvements in Cement - Block Molds; and I do hereby declare the following to be a full, clear, and exact description of the invention, such as will enable others skilled in the art to which it appertains to make and use the same.

This invention relates to new and useful improvements in concrete block molds and it has particular reference to a mold including displaceable or separable walls and adapted especially for use in connection with the blocks forming the subject matter of my copending application, Serial No. 364,466.

The invention aims as a primary object to provide a mold of the above type including separable walls of novel construction, whereby a novel assemblage thereof is attainable.

The invention aims as a further object to provide a mold which shall be simple in its structural details, inexpensive to manufacture and practical and efficient in use.

The details of construction will appear in the course of the following description in which reference is had to the accompanying drawings forming a part of this specification, like characters of reference designating similar parts, throughout the several views, wherein:—

Figure 1:
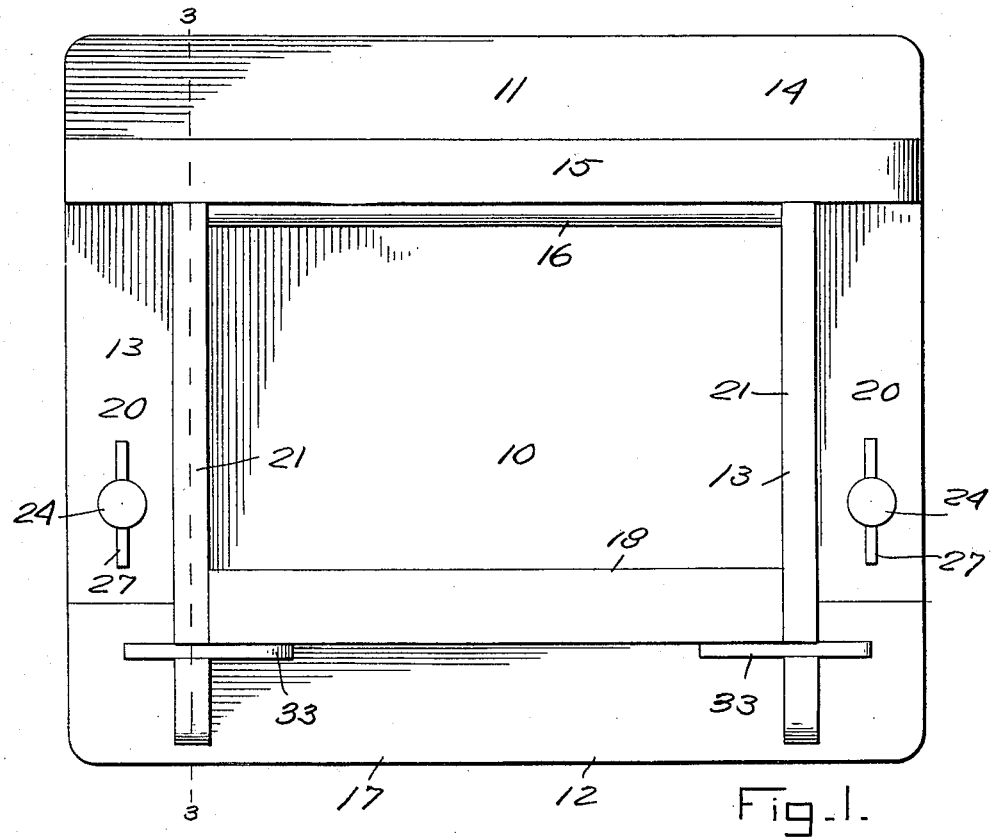
Figure 2:
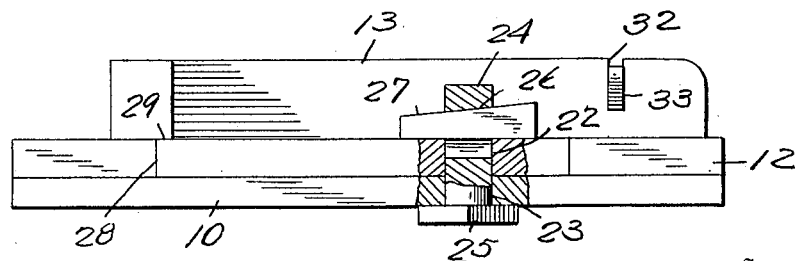

Figure 1 is a top plan view of the preferred embodiment of a mold constructed in accordance with the present invention. Fig. 2 is a side elevation of such mold. Fig. 3 is a vertical sectional view on the line 3—3 of Fig. 1. Fig. 4 is a detailed view of one of the side members of the mold. Fig. 5 is a detailed view of the front wall member. Fig. 6 is a detailed view of the rear wall member together with a part of the supporting base. Fig. 7 is a top plan view showing a slightly modified construction.

In the accompanying drawings, the numeral 10 designates the bottom of the mold, the numeral 11 the rear wall, the numeral 12 the front wall and the numeral 13 the side walls, the latter being similar in construction. As arbitrarily shown, the mold is adapted for the formation of the side blocks illustrated in my copending application and with this object in view, the wall 11 comprehends a base portion 14 and a vertical portion 15 carrying on its inner face a longitudinal rib 16. The rib 16 terminates short of the ends of the portion 15 and may be of any suitable shape in cross section to form a corresponding groove in the block. As shown, said rib is semi-circular in cross section, but it is obvious that other conformations may be employed. In like manner, the front wall 12 comprehends a base portion 17, which is imposed upon the bottom 1 and which carries a vertical portion 18 having its inner face formed with a longitudinal groove 19 corresponding in contour to the rib 16, the groove 19 being provided to form the rib in the block. It is to be noted that the portion 18, is coextensive in length with its groove 19 and with the opposing rib 16.

The side walls 13 each comprehend a base portion 20 which is imposed upon the bottom 10 and vertical portions 21, which, at their front ends project beyond the portions 20. Said portions 20 are constructed with openings 22 which register with openings 23 in the bottom 10 and through which a bolt 24 is inserted, the latter including a head 25 which bears against the under surface of the bottom 10 and having its body portion slotted as at 26 to receive a wedge-shaped locking key 27. The rear wall 11, at each side of the rib 16, has its portion 15 under-cut adjacent its lower end as at 28, a shoulder 29 overhanging the recess 28 thus afforded. The end of the portion 20 of each side wall 13 fits in the recess 28 and is held from vertical displacement by the shoulder 29. The portion 21 of each side wall is provided at its rear end with a square extension 30 which projects through a conformable opening 31 in the portion 15. As previously stated, the portions 21 project beyond the portions 20 and in this projecting relation bear against the ends of the portion 18 of the front wall 12. The projecting ends of the portions 21 are constructed with recesses 32 which are provided for the reception of pivoted latch members 33 provided upon the portion 18 of the front wall.

In the modified embodiment of the invention illustrated in Fig. 7, the front wall is designated by the numeral 12' and the side walls by the numeral 13'. The front wall 12' includes a base portion 17' and a vertical portion 18'. The side walls 13' include base portions 20' and vertical portions 21'. The latter terminate at the ends of the portion 18' of the wall 12' and the said portion 18' carries at its ends projecting lugs 34 which overlie the ends of the portions 21' and which carry pivoted latch members 35 formed for engagement with projecting pins 36 carried by said portions 21'.

It will thus be apparent from the foregoing description that the walls 11, 12 and 13 form an inclosure and that the vertical portions 15, 18 and 21 of said respective walls define the sides of said inclosure, into which latter, the cement or other plastic material to be molded into block form is introduced.

In assembling the sides of the mold the walls 13 have their ends engaged in the recesses 28 and their projections 30 engaged through the openings 31. Said walls are then locked to the bottom 10 by the bolts 24 in the manner above described. The front wall is then placed in position, the portions of said front wall which project beyond the portion 18, being engaged beneath the forwardly projecting portions of the side walls 13. The latches 33 are then engaged in the recesses 32 and the several walls thus assembled are positively held against displacement. The same method of assemblage is employed in the modified construction of the invention illustrated in Fig. 7, the only difference being in the manner of engaging the front wall, in which the latch members 35 are engaged with the pins 36 carried by the side wall portions 21'.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. A mold of the type set forth, comprising a bottom, and a stationary rear wall section carried thereby, and formed at its ends with openings, side wall sections including base portions secured to said bottom and vertical portions formed at their rear ends with extensions for engagement in said openings, a front wall section including a base portion secured to said bottom and a vertical portion having its ends constructed for engagement with the vertical portions of said side wall sections to prevent upward displacement of said front wall section, and latch members carried by said front wall section for engagement with said side wall sections.

2. A mold of the type set forth, comprising a bottom, a rear wall section carried thereby having its ends formed with recesses and with openings, side wall sections including base portions having their ends engaged in said recesses and vertical portions having extensions engaged through said openings, means for holding said side wall sections upon said bottom, said side walls having their vertical portions extended forwardly, a front wall section including a base portion disposed beneath said forwardly extending portions of said side wall sections and a vertical portion disposed between said forwardly extending portions of said side wall sections, and means for engaging said front wall section with said side wall sections.

In testimony whereof, I affix my signature, in presence of two witnesses.

WILLIAM A. CREW.

Witnesses:
GEO. H. CHANDLER,
ISAAC L. PRICE.